United States Patent [19]
Liu

[11] Patent Number: 5,269,598
[45] Date of Patent: Dec. 14, 1993

[54] PERSONAL COMPUTER COMPONENT SUPPORT STRUCTURE

[75] Inventor: Morgan C. Liu, Taoyuan, Taiwan

[73] Assignee: Enlight Corporation, Taoyuan, Taiwan

[21] Appl. No.: 958,557

[22] Filed: Oct. 8, 1992

[51] Int. Cl.⁵ .................... A47B 77/08; A47B 81/00
[52] U.S. Cl. ..................... 312/223.2; 361/683; 361/725; 361/829
[58] Field of Search .............. 312/223.2; 361/391, 361/390, 380, 427, 428, 429

[56] References Cited

U.S. PATENT DOCUMENTS

| | | | |
|---|---|---|---|
| 5,138,525 | 8/1992 | Rodriguez | 312/223.2 X |
| 5,224,019 | 6/1993 | Wong et al. | 361/391 X |
| 5,224,024 | 6/1993 | Tu et al. | 361/429 |

*Primary Examiner*—Timothy V. Eley
*Assistant Examiner*—Khan V. Nguyen
*Attorney, Agent, or Firm*—Ladas & Parry

[57] ABSTRACT

A personal computer component support structure comprises a base casing having a front plate and a back plate with a main frame secured therebetween. The main frame comprises a front portion defining therein a two-staged interior space for respectively receiving therein a 5¼" floppy disk drive and a 3½" floppy disk drive and a rear portion defining therein a second interior space for receiving therein at least one hard disk drive. An I/O port retaining plate and an interface seat are mounted on the back plate. A holder member for supporting a ventilation fan and a speaker is secured on an inside surface of the front plate of the base casing. A cover casing is slidably mounted on the base casing with a front panel disengagably attached to the cover casing and the base casing to define a housing of the computer.

13 Claims, 12 Drawing Sheets

PERSONAL COMPUTER COMPONENT SUPPORT STRUCTURE

BACKGROUND OF THE INVENTION

The present invention generally relates to a personal computer and in particular to a component support structure of a personal computer.

The computer industry is a rapid-changing industry which develops new and more powerful products constantly. Among all kinds of computer products, the personal computer is one of the most competitive products. Users of personal computers are in general satisfied with the currently available personal computers. However, some of the conventional personal computers do not possess a future expendability in structural arrangement of the major components thereof. Further, some of the personal computers do not have a tidy and neat arrangement of the major components thereof so as to make the interior thereof very disorganized and this may make it difficult in replacing parts and/or doing maintenance and preventing the installation of new hardware components or internal devices. Besides, the conventional personal computers use screws to secure the hardware components thereof which makes the assembly/disassembly and maintenance of the computer parts very labor and time consuming. Another problem with screws type securing is the disassembled screws may be lost during maintenance which makes the maintenance even more boring.

SUMMARY OF THE INVENTION

A primary object of the present invention is to provide a personal computer component support structure which comprises a main frame disengagably mounted on a base casing of the computer in a fast assembly/disassembly way to secure the disk drives thereon in a fast and efficient way.

It is another object of the present invention to provide a personal computer component support structure having an I/O port retaining plate and an interface seat which can be mounted on the casing thereof in an easy and efficient way so as to enhance the efficiency of assembly/disassembly and substitution of these components.

It is a further object of the present invention to provide a personal computer component support structure having a holder member for supporting and securing thereon a ventilation fan and a speaker and also providing an auxiliary support for installing interface boards, which can be secured on the base casing of computer in a fast and simple way.

It is a further object of the present invention to provide a personal computer component support structure having a front panel mounted on the casing thereof in a disengagable way so as to cut down parts and assembly cost.

Other objects and advantages of the invention will be apparent from the following description of a preferred embodiment taken in connection with the accompanying drawings.

DETAILED DESCRIPTION OF THE INVENTION

Figure 1:
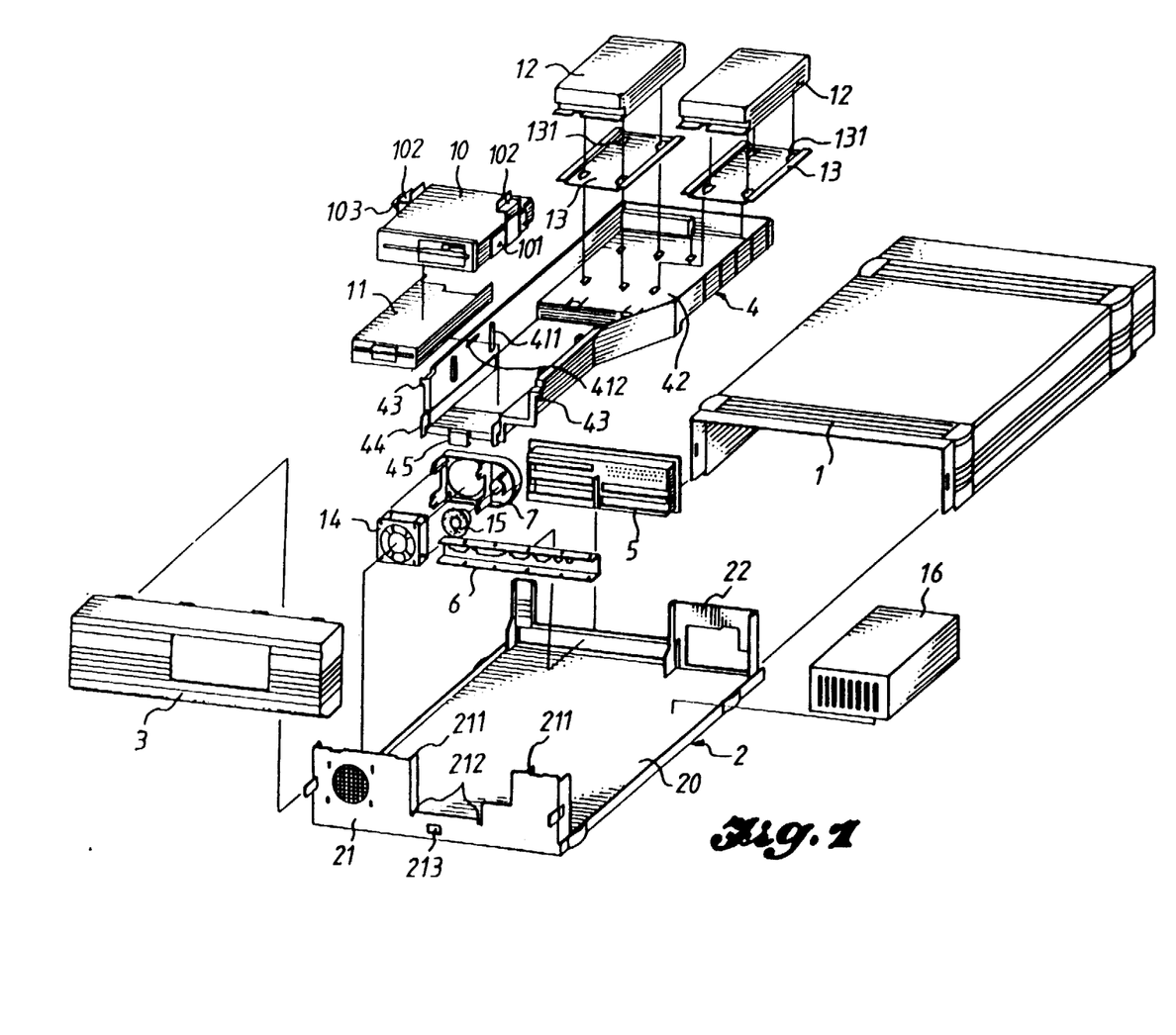
FIG. 1 is a perspective fragmentary view of a personal computer in accordance with the present invention.
Figure 2:
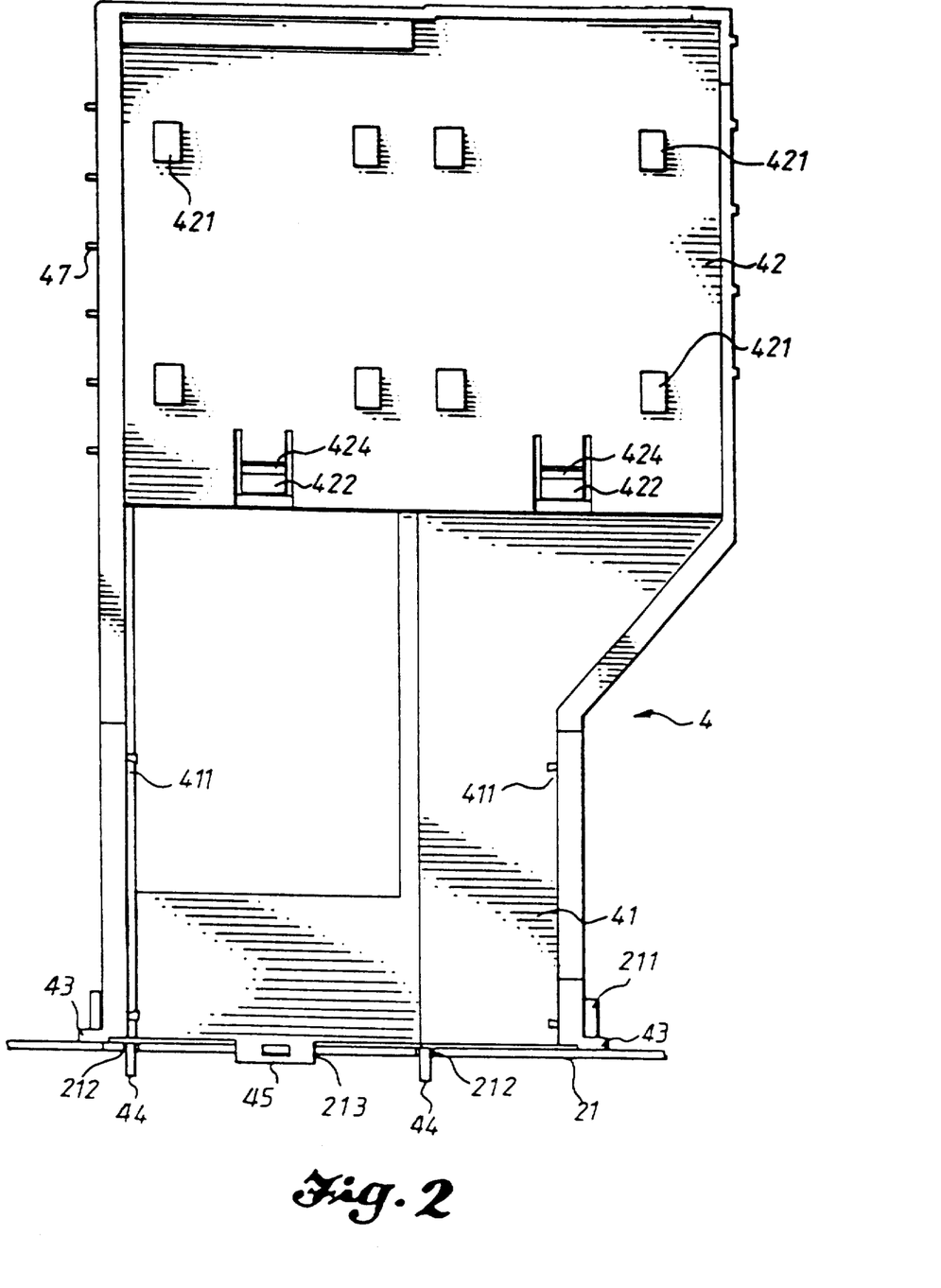
FIG. 2 is a plane view of a main frame of the personal computer shown in FIG. 1.
Figure 3:
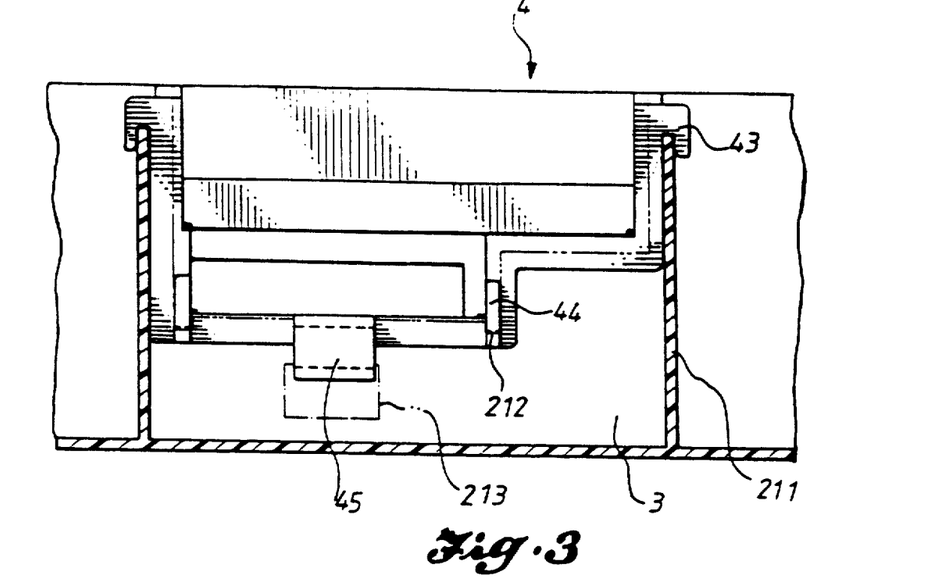
FIG. 3 is a front view showing the main frame mounted on the base casing of the personal computer.
Figure 4:
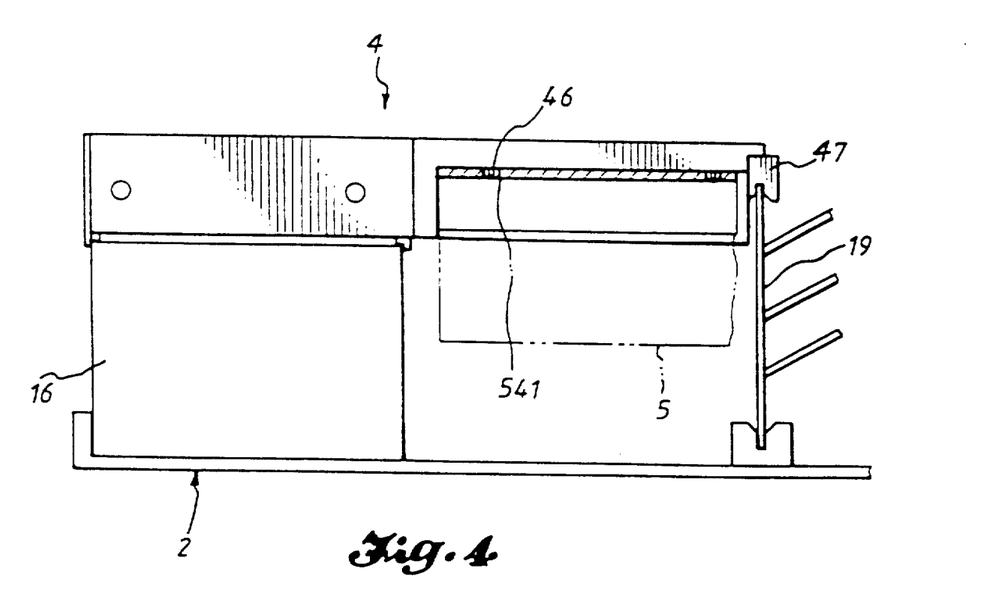
FIG. 4 is a rear view showing the main frame mounted on the base casing of the personal computer.
Figure 5:
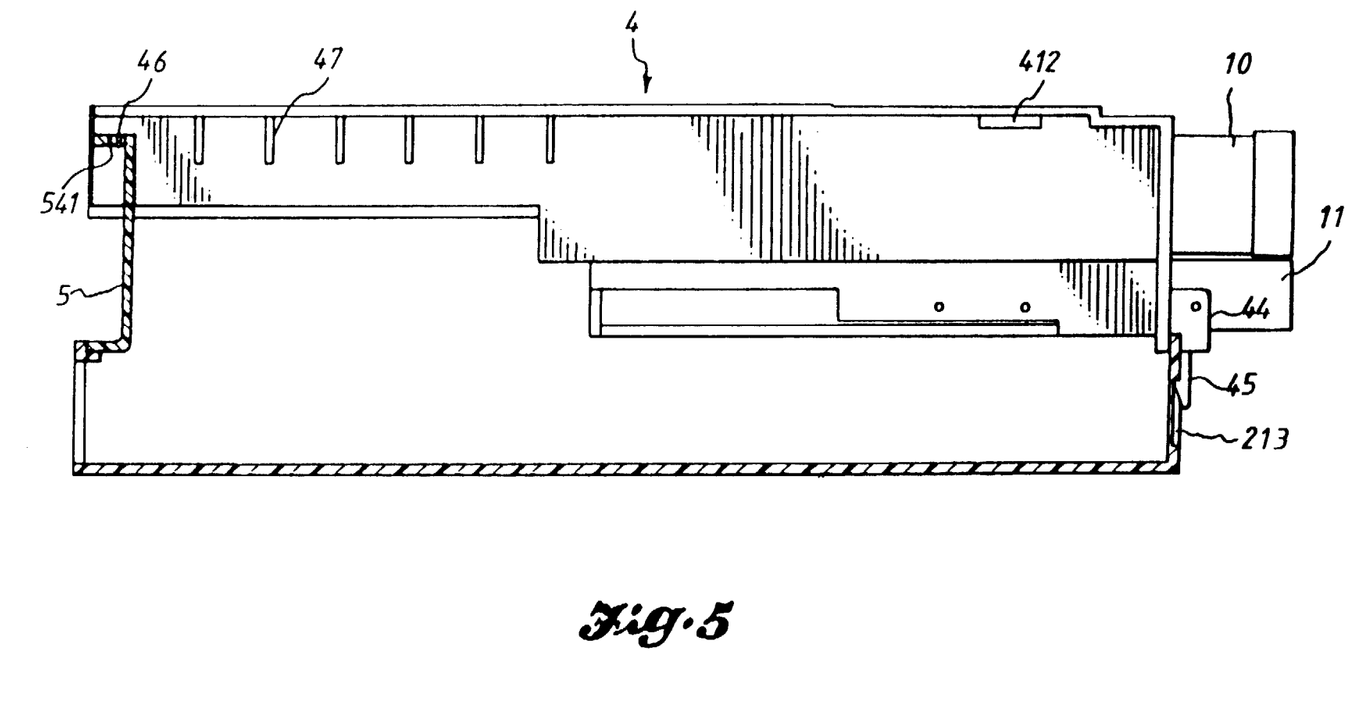
FIG. 5 is a side elevational view showing the main frame mounted on the base casing of the personal computer.

With reference to FIG. 1, a personal computer having a component support structure made in accordance with the present invention comprises a casing constituted by a cover casing 1 and a base casing 2. The base casing 2 is a U-shaped member comprising a bottom plate 20 connecting between a front plate 21 and a back plate 22. A main frame 4 is supported and secured between the front plate 21 and the back plate 22, generally extending and resting above one side of the bottom plate 20. The main frame 4 has a two-staged space 41 in the front portion thereof for receiving and securing therein a 5¼" floppy disk drive 10 and a 3½" floppy disk drive 11 and a second disk space 42 in the rear portion thereof for receiving and securing two hard disk drives 12 in a side-by-side manner. An I/O port retaining plate 6 is secured on an interior surface of the back plate 22 with a lower edge thereof abutting against the bottom plate 20. An interface seat 5 is secured on the back plate 22 with a lower side thereof abutting against an upper edge of the I/O port retaining plate 6. A holder member 7 which is to support and secure a ventilation fan 14 and a speaker 15 and to provide an auxiliary support in installing interface boards is secured on an interior surface of the front plate 21. The cover casing 1 is slidably mounted on the base casing 2. A front panel 3 is then secured on the computer casing in a disengagable way.

Referring to FIGS. 2 through 5, the hard disk space 42 of the main frame 4 comprises two sets of holding pieces 421 respectively corresponding to the four corners of each of the hard disk drives 12. The holding pieces 421 are substantially inverted L-shaped members projecting upward from a surface of the main frame 4. Each set of the holding pieces 421 further includes a resilient securing piece 422 which comprises a raised strip 424 and is substantially disposed on the surface of the main frame 4 at a location close to a front edge of each of the hard disk drives 12. Each of the hard disk drives 12 is supported by a seat 13 which may be secured to a bottom side of the hard disk drive 12 by any known means. Each of the hard disk seats 13 comprises four openings 131 respectively corresponding to the holding pieces 421 to receive therein the holding pieces 421. The hard disk drives 12 with the seats 13 secured thereon may be disposed into the hard disk space 42 in a sliding way to have the holding pieces 421 inserted into the opening 131 of the hard disk seats 13 and the raised strips 424 of the securing pieces 422 engage with the front edges of the hard disk drives 12 and thus securing the hard disk drives 12 on the main frame 4. To disassemble the hard disk drives 12 from the main frame 4, one only needs to depress the securing pieces 422 to release the hard disk drives 12 and thus allowing the hard disk drives 12 to be slidably withdrawn along an opposite direction.

The floppy disk space 41 of the main frame 4 comprises two stages or two levels, an upper level and a lower level. The lower level is to receive and hold therein a 3½" floppy disk drive 11 which may be secured on the main frame 4 by screws (not shown) or other suitable means. The upper level is defined by two opposite interior surfaces of the main frame 4 on each of which a dovetail groove 411 is formed with a recess 412 formed therein. Corresponding to the dovetail grooves 411, there are complemental dovetail plates 101 respectively secured on opposite sides of the 5¼" floppy disk drive 10 to be slidably received within the dovetail grooves 411. On each of the dovetail plates 101, a retaining plate 102 is resiliently disposed with a sideward protrusion 103 formed thereon. In installing the 5¼" floppy disk drive 10, the dovetail plates 10 are slidably inserted into the dovetail grooves 411 along a vertically downward direction until the sideward protrusions 103 of the retaining plates 103 snap-on engage with the recesses 412 formed inside the dovetail grooves 411. By depressing the resilient retaining plates 102 inward to have the sideward protrusions 103 disengage from the recesses 412, the 5¼" floppy disk drive 10 can be removed out of the main frame 4 along a vertically upward direction.

The main frame 4 has in a front side thereof two laterally-extended tabs 43 formed on the opposite side walls thereof respectively with a notch thereon to form a flat hook-like member which hooks and rests on a strip-like inward extension 211 of the front plate 21 of the base casing 2. The main frame 4 also has in the front thereof two forward-extended tabs 43 which similarly define two flat hook-like members to hook and rest on corresponding notches 212 formed on the front plate 21 of the base casing 2. A paw member 45 is formed between the forward-extended tabs 44 to engage with a recessed portion 213 formed on the front plate 21 so as to secure the main frame 4 on the base casing 2.

Within a space defined by the rear portion of the main frame 4 and the bottom plate 20, a power supply 16 is mounted on the bottom plate 20 in a way similar to the hard disk drives 12. A pair of cruciform posts 46, each of which depends from the main frame 4 and has a conical end portion, penetrate into holes 541 formed on the interface seat 5 (to be described in detail hereinafter) and thus partially securing and supporting the main frame 4 by the interface seat 5. A plurality of retaining plates 47 equally spaced on an outside surface of the main frame 4 for holding a top edge of the interface board 19.

Figure 6:
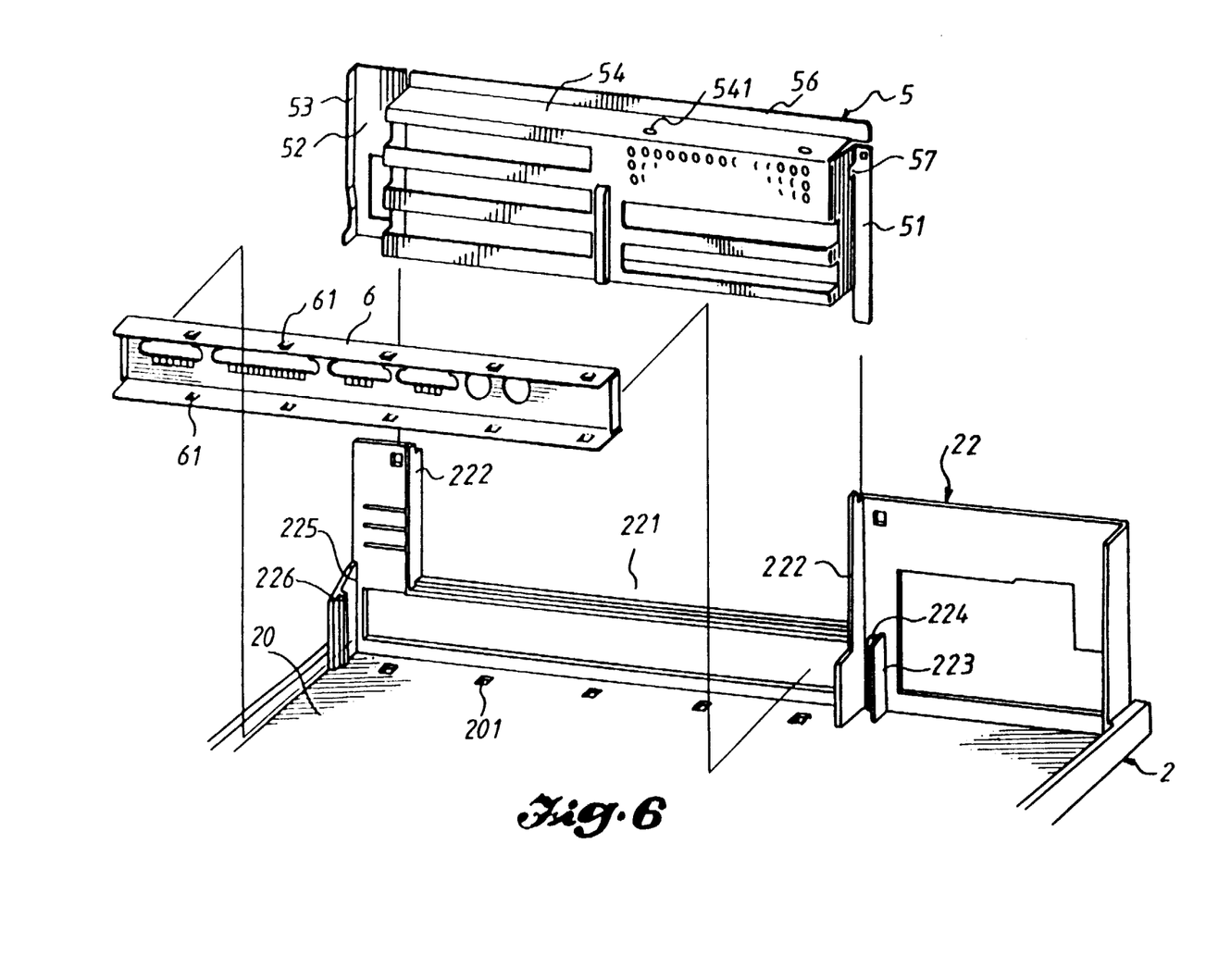
FIG. 6 is a partial fragmentary view showing an I/O port retaining plate and an interface seat with respect to the personal computer.
Figure 7:
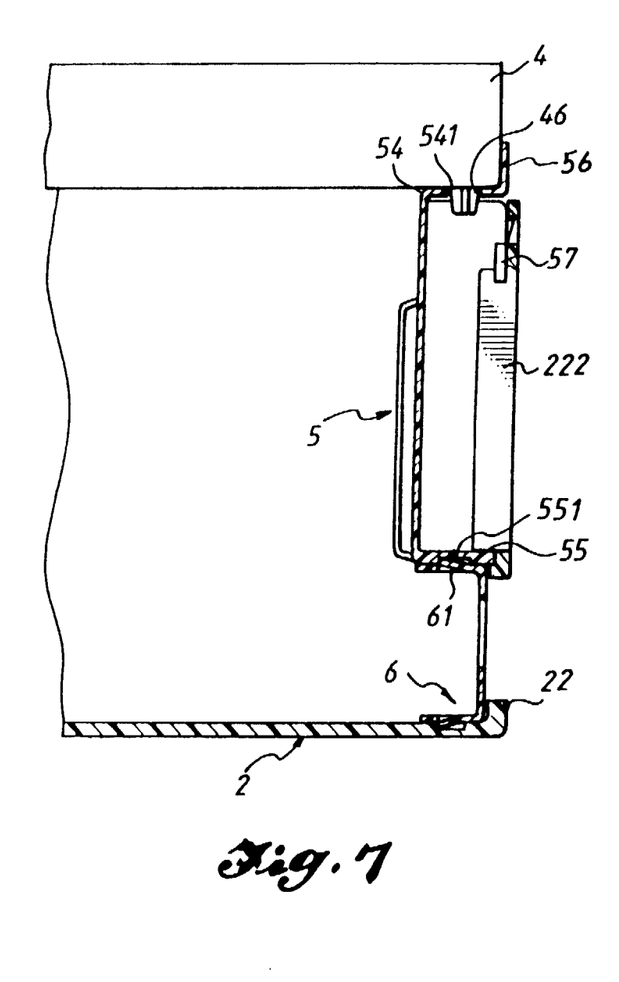
FIG. 7 is a partial cross-sectional view showing the I/O port retaining plate and the interface seat mounted on the computer casing.

With reference to FIGS. 6 and 7, the I/O port retaining plate 6 is in connection with the mother board (not shown) of the computer with a plurality of outward-inclined tabs 61 formed on both a top edge and a bottom edge thereof. In installation, the bottom edge tabs 61 are inserted into and engaged by recesses 201 formed on the bottom plate 20 of the base casing 2. The interface seat 5 comprises a rectangular basin-like structure with extension portions 51 and 52 on opposite lateral sides thereof. The extension plate 52 has a perpendicular flange 53 formed thereon. The top side wall 54 of the interface seat 5 has two holes 541 to receive therein the posts 46 of the main frame 4. The top side wall 54 of the interface seat 5 has a third extension 56 formed thereon. The bottom side wall of the interface seat 5 has a plurality of recesses 551 to respectively engage with the top edge outward-inclined tabs 61 of the I/O port retaining plate 6. The back plate 22 comprises a cut-out recess 221 which has two opposite sides to guidingly receive therein the interface seat 5. On each of the opposite sides of the cut-out recess 221, a guiding plate 222 with a notch formed on the top thereof is attached for guiding and maintaining the interface seat 5 in-between. A strip 223 is formed on the inside surface of the back plate 22 to define, along with one of the guiding plates 222, a first gap of which the width allows the first extension portion 51 of the interface seat 5 to be inserted therein. A constraint strip 224 is formed within the gap on the strip 223, directing toward the one of the guiding plates 222 to define, together with the back plate 22, a passage which allows the first extension portion 51 of the interface seat 5 to be inserted and thus secured therein. On the other side of the cut-out recess 221, a side extension 225 is provided to define, along with the other one of the guiding plates 222, a passage to receive therein the second extension portion 52 of the interface seat 5. A second constraint strip 226 is formed on the side extension 225, serving to retain the second extension portion 52 in position. In installing the interface seat 5, the top edge outward-inclined tabs 61 of the I/O port retaining plate 6 are first engaged by the recesses 551 of the interface seat 5 and a pair of lugs 57 which are respectively formed on the extension portions 51 and 52 of the interface seat 5 and extending toward each other are disposed into the notches of the guiding plates 222. Meanwhile, the extension portion 51 penetrates into the passage between the constraint strip 224 and the back plate 22 and the extension portion 52 goes into the passage defined by the guiding plate 222 and the side extension 225 and the flange 53 thereof abuts against the constraint strip 226. When the posts 46 of the main frame 4 are inserted into the holes 541 formed on the top side wall 54 of the interface seat 5, the rear edge of the main frame 4 abuts against the third extension 56 of the top side wall 54 of the interface seat 5.

Figure 8:
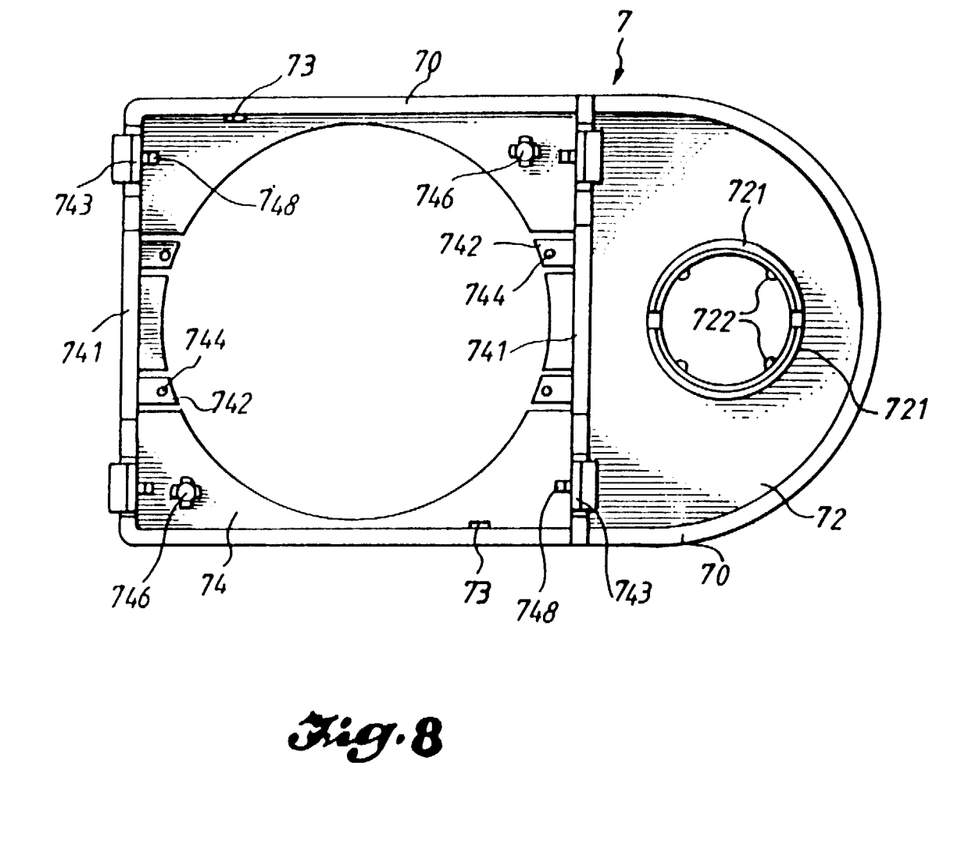
FIG. 8 is a plane view showing a holder member of the personal computer shown in FIG. 1.
Figure 9:
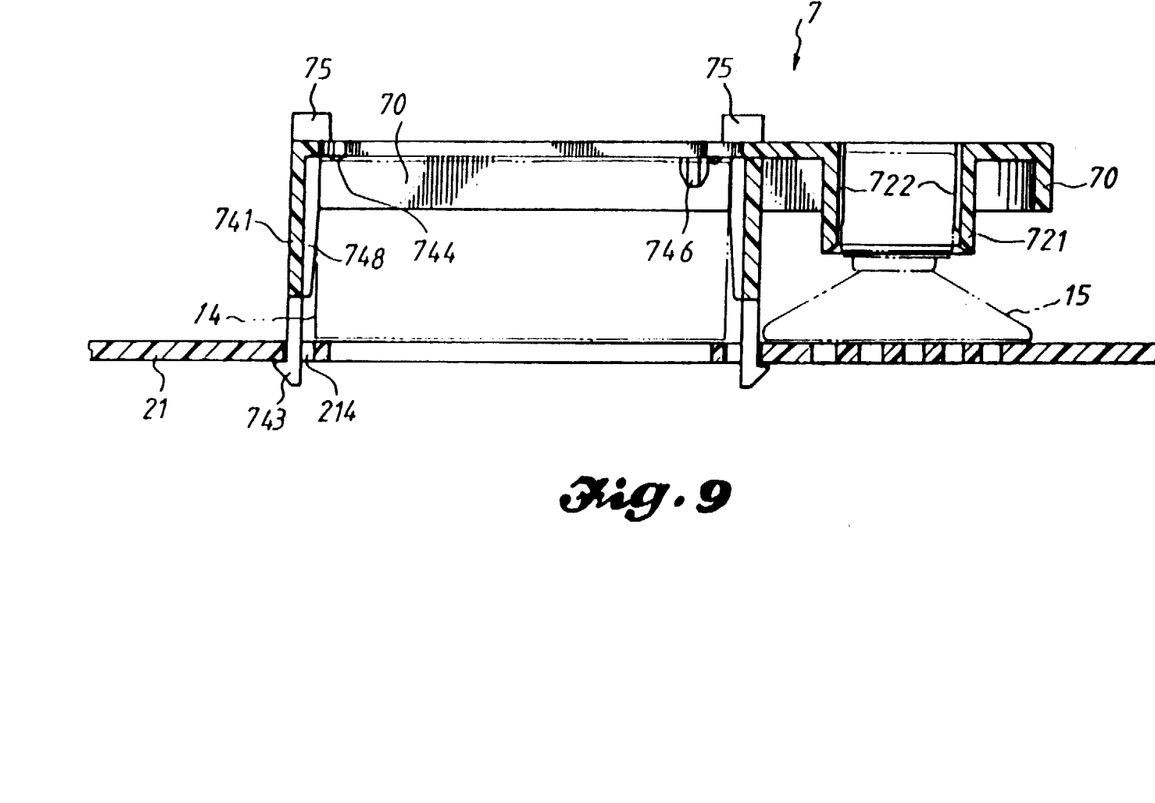
FIG. 9 is a top direction cross-sectional view of the holder member mounted on the computer casing.
Figure 10:
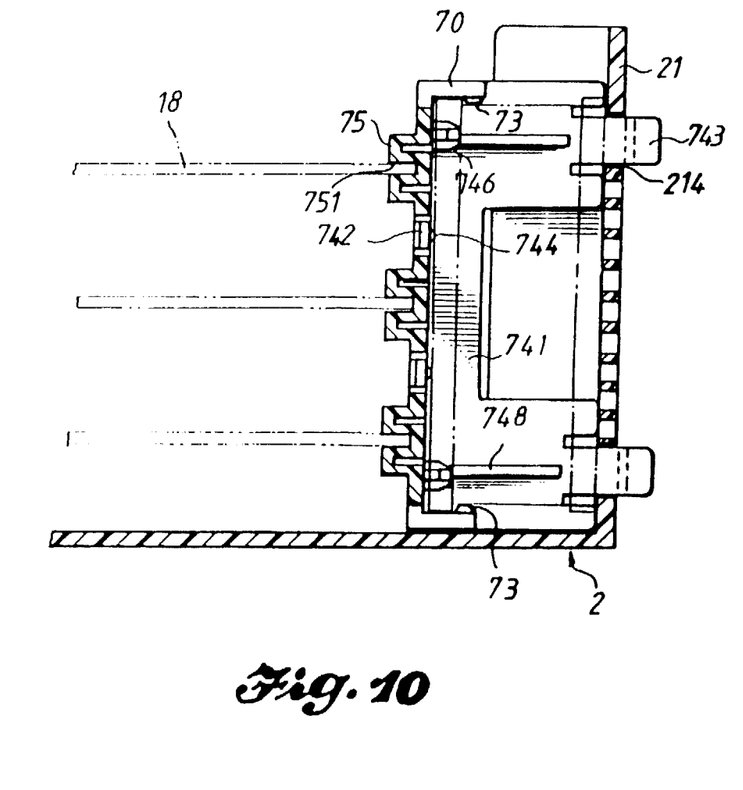
FIG. 10 is a sideward direction cross-sectional view of the holder member mounted on the computer casing.

With reference to FIGS. 8 through 10, the holder member 7 comprises a shallow pan-like body made of plastics surrounded by a circumferential perpendicular flange 70. A speaker holder 72 and a fan holder 74 are formed on one side of the holder member 7. The speaker holder 72 comprises a pair of opposite retaining pieces 721, each in the form of a semi-circle arc with at least a longitudinal rib 722 formed on an inside surface thereof to securely hold the speaker 15 therein. The fan holder 74 comprises a pair of flat legs 741, each having a pair of hooks 743 formed on the lower end thereof to insert into and hook on corresponding holes 214 formed on the front plate 21 of the base casing 2. Reinforcing ribs 748 are formed on the flat legs 741 at the locations corresponding to the hooks 743. A pair of cruciform rods 746 are formed on the side surface of the holder member 7 in a diametrically symmetrical way with respect to the receiving hole of the fan holder 74 to be received in corresponding holes (not shown) formed on the ventilation fan 14 to guide the installation of the fan 14 which is substantially disposed between the reinforcing ribs 748. A pair of raised bosses 73 are formed on the circumferential flange 70 to contact and thus more securely hold the ventilation fan 14 in position.

On the front plate 21 of the base casing 2, there are provided with the holes 214 which are substantially rectangular in shape to respectively receive and secure therein the hooks 743 of the flat legs 741. The hooks 743 are resilient so that when the hooks 743 are inserted into the rectangular holes 214, they are slightly bent to allow the hooks 743 to enter the holes 214 and hold the holder member 7 thereon. The fan holder 74 is provided with a plurality of resilient plates 742 extending from a surface of each of the flat legs 741 toward each other, each having a raised portion 744 thereon so that when the ventilation fan 14 is disposed between and abutting against the inside surface of the front plate 21 and a surface of the fan holder 74, a surface of the ventilation fan 14 contacts the raised portions 744 and slightly bends the resilient plates 742 away from the ventilation fan surface so as to have the ventilation fan 14 securely held by the resilient reaction force of the resilient plates 742. The holder member 7 further has a plurality of guiding blocks 75 disposed on an outside surface thereof to define therebetween a plurality of guiding slots 751 for respectively receiving and supporting therein an edge of an interface board 18 when the interface boards 18 are installed on the mother board (not shown).

Figure 11:
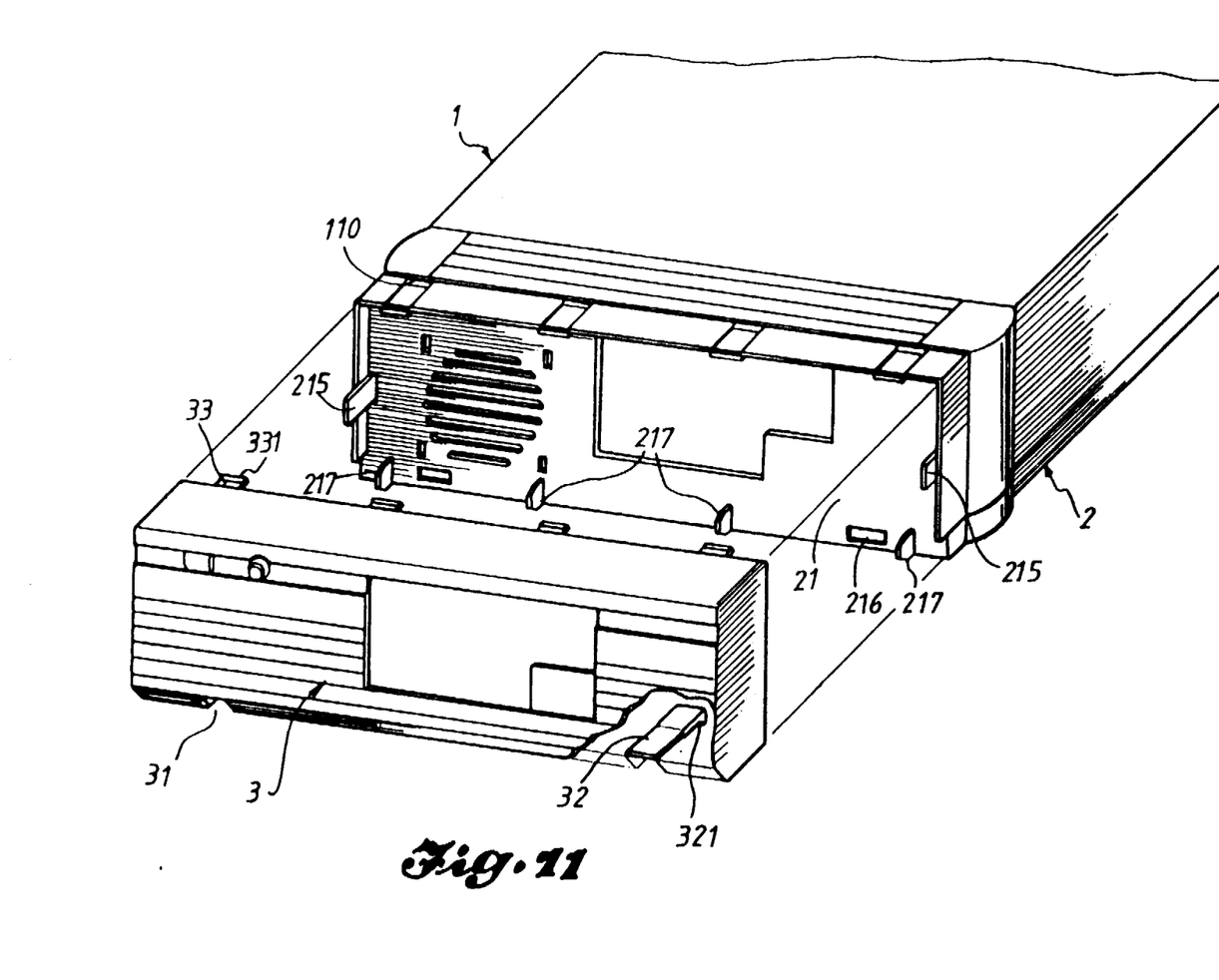
FIG. 11 is a perspective view showing a front panel removed from the computer casing.
Figure 12:
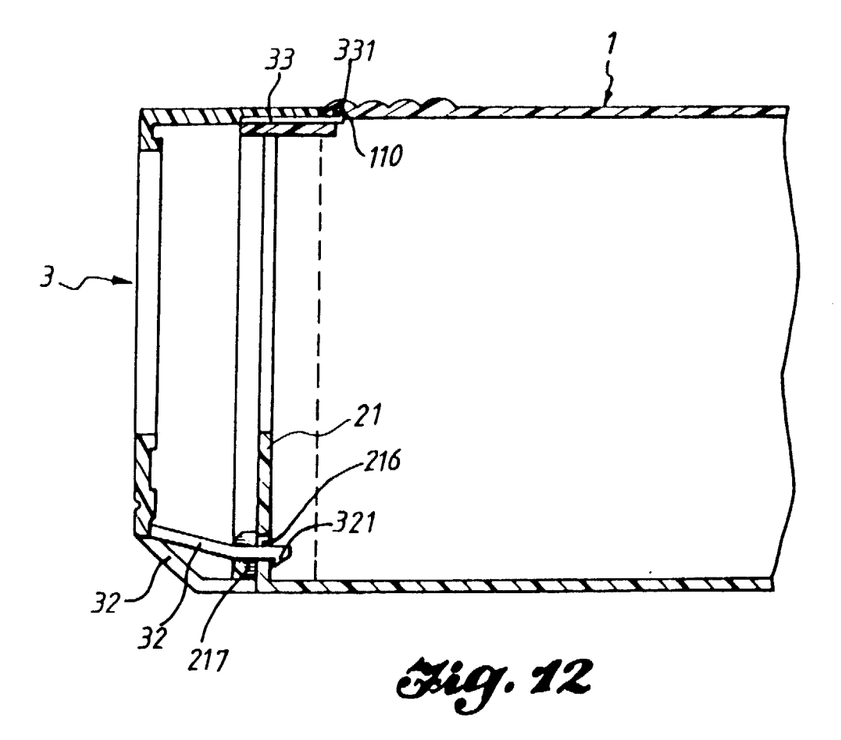
FIG. 12 is a sideward direction cross-sectional view showing the front panel mounted on the computer casing.
Figure 13:
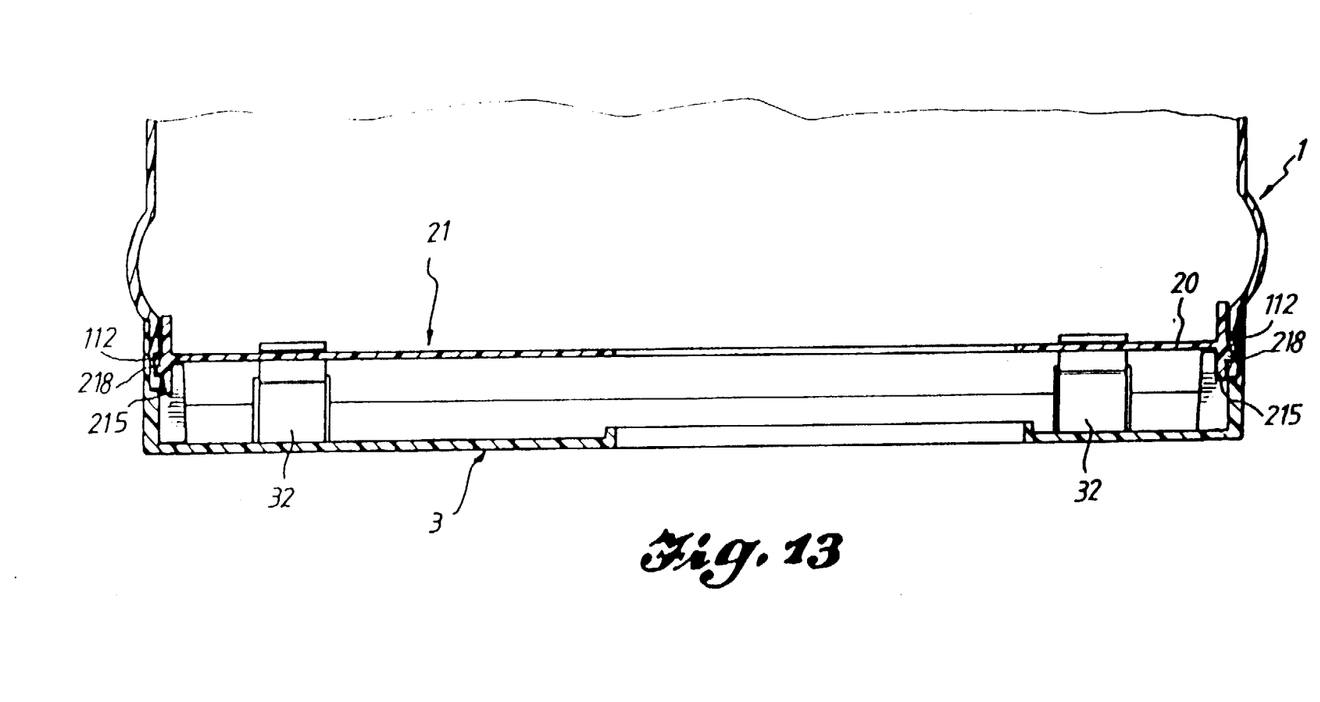
FIG. 13 is a top direction cross-sectional view showing the front panel mounted on the computer casing.

With reference to FIGS. 11 through 13, the cover casing 1 is mounted on the base casing 2 in a slidable way and has on a rear side thereof two inward-bent flanges with guiding poles (not shown) formed on an inside surface of said inward-bent flanges to be inserted into corresponding holes formed on the back plate 22 of the base casing 2 to hold the cover casing 1 in position. The cover casing 1 has two opposite side plates on each of which a recessed portion 112 is formed to be engaged by a pawl 218 of a securing tab 215 (see FIG. 13) which is mounted on a lateral edge of the front plate 21 of the base casing 2 so as to secure the cover casing 1 on the base casing 2.

The front panel 3 has a top side with a plurality of catch members 33 mounted thereon and a bottom side with two grooves 31 formed thereon. Each of the catch members 33 has a hook-like projection 331 formed on a remote end thereof. Each of the grooves 31 has a catch plate 32 extending generally toward the front plate 21 of the base casing 2 with a catching hook 321 formed on a remote end thereof. Corresponding to each of the catch plates 32, a slot 216 is formed on the front plate 21 to receive and retain the corresponding second catch plate 32 therein. The front plate 21 also has a plurality of slots 110 formed thereon in correspondence with the catch members 33 to receive and retain the catch members 33 therein. In installing the front panel 3 on the computer casing, the catch members 33 are first inserted into the slots 110 to have the hook-like projections 331 caught by the slots 110, then swiveling the front panel 3 about the slots 110 to have the catch plates 32 forcibly inserted into and the catching hooks 321 thereof caught by the slots 216. The front plate 21 comprises a plurality of spacing tabs 217 extending generally toward the front panel 3 and abutting an interior surface of the bottom side of the front panel 3 when the front panel 3 is mounted on the computer casing to prevent the front panel 3 from accidently disengaging from the computer casing due to an undue external force.

It is apparent that although the invention has been described in connection with a preferred embodiment, those skilled in the art may make changes to certain features of the preferred embodiment without departing from the spirit and scope of the invention as defined in the appended claims.

What is claimed is:

1. A personal computer component support structure comprising:

a base casing comprising a front plate and a back plate with a bottom plate connecting therebetween;

a main frame mounted between said front plate and back plate of the base casing, said main frame having a front portion defining therein an upper level interior space and a lower level interior space for respectively receiving therein a floppy disk drive and a rear portion defining therein a third interior space for receiving therein at least one hard disk drive, said third interior space comprising a plurality of holding pieces projecting from a surface thereof and a resilient securing piece substantially located close to a front edge thereof and at the same level of said surface;

an input/output port retaining plate disposed on an interior surface of said back plate with a bottom edge thereof secured on said bottom plate;

an interface seat secured on said back plate with a lower side secured on and supported by a top edge of said input/output port retaining plate and an upper side contacting and supporting said main frame;

a holder member, which is secured on an inside surface of said front plate, comprising on a first side thereof a speaker holder which has a pair of retaining pieces for holding a speaker and a fan holder which has a pair of flat legs, each of which has a pair of hooks extending along a longitudinal direction and a rib formed on an inside surface thereof;

a cover casing slidably mounted on said base casing; and a front panel disengagably mounted on said cover casing and said base casing.

2. The personal computer component support structure as claimed in claim 1 wherein said main frame has in a front side of opposite side walls thereof two laterally-extended flat hook members which respectively hook and rest on a strip inward extension of said front plate of the base casing and wherein said main frame also has in the front side thereof two forward-extended flat hook-like members to hook and rest on corresponding notches formed on said front plate, a resilient paw member being formed between said forward-extended hook members to engage with a recessed portion formed on said front plate.

3. The personal computer component support structure as claimed in claim 1 wherein said main frame comprises a pair of cruciform posts, each of which depends from a bottom of the rear portion thereof and has a conical end portion to penetrate into holes formed on said interface seat.

4. The personal computer component support structure as claimed in claim 1 wherein said main frame further comprises a plurality of interface board retaining tabs disposed on one of the side walls in an equally-spaced way.

5. The personal computer component support structure as claimed in claim 1 wherein said input/output port retaining plate comprises a plurality of outward-inclined tabs formed on both the top edge and the bottom edge thereof, the top edge outward-inclined tabs being inserted into recesses formed on the lower side of said interface seat and the bottom edge outward-inclined tabs being inserted into and engaged by recesses formed on said bottom plate of the base casing.

6. The personal computer component support structure as claimed in claim 1 wherein said interface seat comprises a rectangular basin-like structure having a first and a second extension portions respectively formed on opposite lateral sides thereof, said second extension portion comprising a perpendicular flange formed thereon, a pair of lugs respectively formed on said first and second extension portions and extending toward each other to be supported and engaged by guiding plates attached on said back plate, a lower end of each of said extension portions penetrating a passage defined between said back plate and strip members mounted thereon with the perpendicular flange of said second extension portion abutting against a strip formed on a side extension of said back plate.

7. The personal computer component support structure as claimed in claim 1 wherein each of the retaining pieces of said speaker holder comprises a semi-circle arc member with at least a rib formed on an inside surface thereof.

8. The personal computer component support structure as claimed in claim 1 wherein said holder member has on a surface of each of said flat legs a resilient plate extending horizontally with a raised portion thereon.

9. The personal computer component support structure as claimed in claim 1 wherein said holder member has at least a cruciform guiding rod corresponding to a hole pre-formed on a ventilation fan which is to be held on said fan holder.

10. The personal computer component support structure as claimed in claim 1 wherein said holder member comprises a perpendicular circumferential flange and a raised boss formed on each of segments of said circumferential flange which defines opposite side walls of said fan holder.

11. The personal computer component support structure as claimed in claim wherein said holder member comprises at least a pair of guiding blocks disposed on a second side thereof with a guiding slot formed in-between.

12. The personal computer component support structure as claimed in claim 1 wherein said cover casing has on a rear side thereof two inward-bent flanges with guiding poles formed on an inside surface of said inward-bent flanges to be inserted into corresponding holes formed on said back plate of the base casing to hold said cover casing in position, said cover casing having two opposite side plates on each of which a recessed portion is formed to be engaged by a pawl formed on a securing tab which is mounted on a lateral edge of said front plate of the base casing.

13. The personal computer component support structure as claimed in claim 1 wherein said front panel comprises a top side with a plurality of catch members mounted thereon to engage with a plurality of first slots formed on said front plate of the base casing and a bottom side with two grooves formed thereon, each of said two grooves having a catch plate extending generally toward said front plate of the base casing to engage with second slots formed on said front plate.

* * * * *